(12) United States Patent
Baltz et al.

(10) Patent No.: US 11,700,349 B2
(45) Date of Patent: Jul. 11, 2023

(54) CAMERA AND IMAGE PROCESSING METHOD

(71) Applicants: Kyle L. Baltz, Rossmoor, CA (US); John E. Carlson, Farmington Hills, MI (US)

(72) Inventors: Kyle L. Baltz, Rossmoor, CA (US); John E. Carlson, Farmington Hills, MI (US)

( * ) Notice: Subject to any disclaimer, the term of this patent is extended or adjusted under 35 U.S.C. 154(b) by 0 days.

(21) Appl. No.: 17/194,628

(22) Filed: Mar. 8, 2021

(65) Prior Publication Data

US 2022/0014687 A1 Jan. 13, 2022

Related U.S. Application Data

(60) Continuation of application No. 15/946,945, filed on Apr. 6, 2018, now Pat. No. 10,944,917, which is a
(Continued)

(51) Int. Cl.
| | |
|---|---|
| *H04N 5/262* | (2006.01) |
| *H04N 23/55* | (2023.01) |
| *H04N 23/75* | (2023.01) |
| *H04N 23/45* | (2023.01) |
| *H04N 23/62* | (2023.01) |

(Continued)

(52) U.S. Cl.
CPC ......... *H04N 5/2621* (2013.01); *H04N 5/2625* (2013.01); *H04N 23/45* (2023.01); *H04N 23/55* (2023.01); *H04N 23/62* (2023.01); *H04N 23/63* (2023.01); *H04N 23/72* (2023.01); *H04N 23/73* (2023.01); *H04N 23/75* (2023.01); *H04N 23/76* (2023.01); *H04N 23/80* (2023.01); *H04N 23/951* (2023.01)

(58) Field of Classification Search
CPC ....... G03B 17/56; H04N 5/2251–2257; H04N 5/238; H04N 5/262; H04N 5/2621; H04N 5/2625; G02B 5/204; G02B 26/02; G02B 26/026
See application file for complete search history.

(56) References Cited

U.S. PATENT DOCUMENTS

| | | | | |
|---|---|---|---|---|
| 2004/0119872 A1* | 6/2004 | Ichikawa | ............ | H04N 5/2254 348/E5.04 |
| 2010/0259824 A1* | 10/2010 | Mitsuhashi | .......... | H04N 5/2254 359/585 |

(Continued)

FOREIGN PATENT DOCUMENTS

| | | | | |
|---|---|---|---|---|
| EP | 2752697 A1 * | 7/2014 | ......... | G02B 27/281 |
| JP | 2009258618 A * | 11/2009 | ............... | G02B 5/22 |

*Primary Examiner* — Paul M Berardesca
(74) *Attorney, Agent, or Firm* — Carlson, Gaskey & Olds, P.C.

(57) ABSTRACT

A camera system and method provide a trailing motion blur effect without the use of a flash. In one embodiment, a variable light-transmissive filter is positioned in front of an image sensor. While the light-transmissive property of the filter is lower, the blurred image of the object in motion is produced. The light-transmissive property of the filter is increased during the exposure in order to produce a clearer image of the object. In a method, a plurality of images taken in rapid succession are combined to produce a clear image of the object with a trailing blurred image of the object.

16 Claims, 14 Drawing Sheets

Related U.S. Application Data continuation-in-part of application No. 15/434,973, filed on Feb. 16, 2017, now Pat. No. 9,942,485, which is a division of application No. 14/488,238, filed on Sep. 16, 2014, now Pat. No. 9,609,236.

(60) Provisional application No. 61/878,265, filed on Sep. 16, 2013.

(51) Int. Cl.
  *H04N 23/63* (2023.01)
  *H04N 23/72* (2023.01)
  *H04N 23/73* (2023.01)
  *H04N 23/76* (2023.01)
  *H04N 23/80* (2023.01)
  *H04N 23/951* (2023.01)

(56) References Cited

U.S. PATENT DOCUMENTS

| | | | | |
|---|---|---|---|---|
| 2012/0062845 A1* | 3/2012 | Davis | H04N 5/2353 | 352/219 |
| 2012/0257097 A1* | 10/2012 | Takai | G03B 9/10 | 348/340 |
| 2013/0258179 A1* | 10/2013 | Shintani | H04N 5/23209 | 348/371 |
| 2014/0300805 A1* | 10/2014 | Davis | H04N 5/238 | 348/362 |
| 2015/0015977 A1* | 1/2015 | Karasawa | G02B 7/006 | 359/892 |

* cited by examiner

CAMERA AND IMAGE PROCESSING METHOD

BACKGROUND

The present application relates generally to photography and more particularly to an improved digital camera and method that provides a desirable motion blur effect.

When shooting action scenes, such as sports, photographers make an artistic decision regarding shutter speed. A fast shutter speed can freeze the action in clear, sharp detail. A slower shutter speed will show some "motion blur" for the faster moving objects or people in the scene. Sometimes the photographer chooses a shutter speed such that the fast-moving objects (e.g. ball, baseball bat, arm throwing a ball, etc) are somewhat blurred, but the relatively stationary objects (including the subject's face) are sharp. A properly chosen shutter speed can provide a sense of the motion in the scene while still providing sharp detail for most of the scene.

Additionally, with the use of a flash, there are additional options for the action photographer. By choosing a shutter speed long enough to show some motion blur and by setting the flash to occur at the end of the duration in which the shutter is open (sometimes known as "rear-curtain sync" or "second curtain sync"), the photo can have motion blur that appears to trail a fairly clear image of the object in motion.

SUMMARY

A camera according to several embodiments and an image processing method provide the ability to provide trailing motion blur without a flash. A flash is not always suitable or appropriate in a particular setting. The flash can be disruptive to other spectators or the participants in the activity being photographed. The action may be outside where it is too bright or the action is too far to effectively use the flash for rear-curtain sync motion blur effect.

Several embodiments of the present invention provide the trailing motion blur effect without a flash, but with novel hardware arrangements. Other embodiments provide this effect with standard (or at least available) hardware, but with novel software. It is also contemplated that the disclosed novel hardware and software could have other uses and could provide effects other than trailing motion blur.

In one embodiment, a variable light-transmissive filter is positioned in front of an image sensor. While the light-transmissive property of the filter is lower, the blurred image of the object in motion is produced during a longer period of exposure. The light-transmissive property of the filter is increased toward the end the exposure in order to produce a clearer image of the object at the end of the exposure.

In a method, a plurality of images taken in rapid succession are combined to produce a clear image of the object with a trailing blurred image of the object.

In another embodiment, a smartphone includes a first camera configured to provide a first image of an object at a first exposure time and a second camera configured to provide a second image of the object at a second exposure time shorter than the first exposure time. The smartphone further includes a processor programmed to combine the first image and the second image to generate a final image having a motion blur of the object trailing a clearer image of the object in the final image.

BRIEF DESCRIPTION OF THE DRAWINGS

FIGS. 5-9 is an example series of image arrays for explaining a method according to another embodiment.

FIG. 10 is an example of an image array resulting from a single iteration of the smear function applied to the image arrays of FIGS. 5-9.

FIG. 11 is an example protection array that was created in the first iteration of the smear function.

FIG. 12 is an image depicting the smeared array after the second iteration of the smear function.

FIG. 13 is a view of the protection array after the second iteration of the smear array.

FIG. 14 is an image depicting the smeared array after the third iteration of the smear function.

FIG. 15 is an image depicting the last smeared array created by the completion of the smear function process.

FIG. 16 is an image depicting the result of the overlay function (overlaid array).

DESCRIPTION OF A PREFERRED EMBODIMENT

Figure 1:
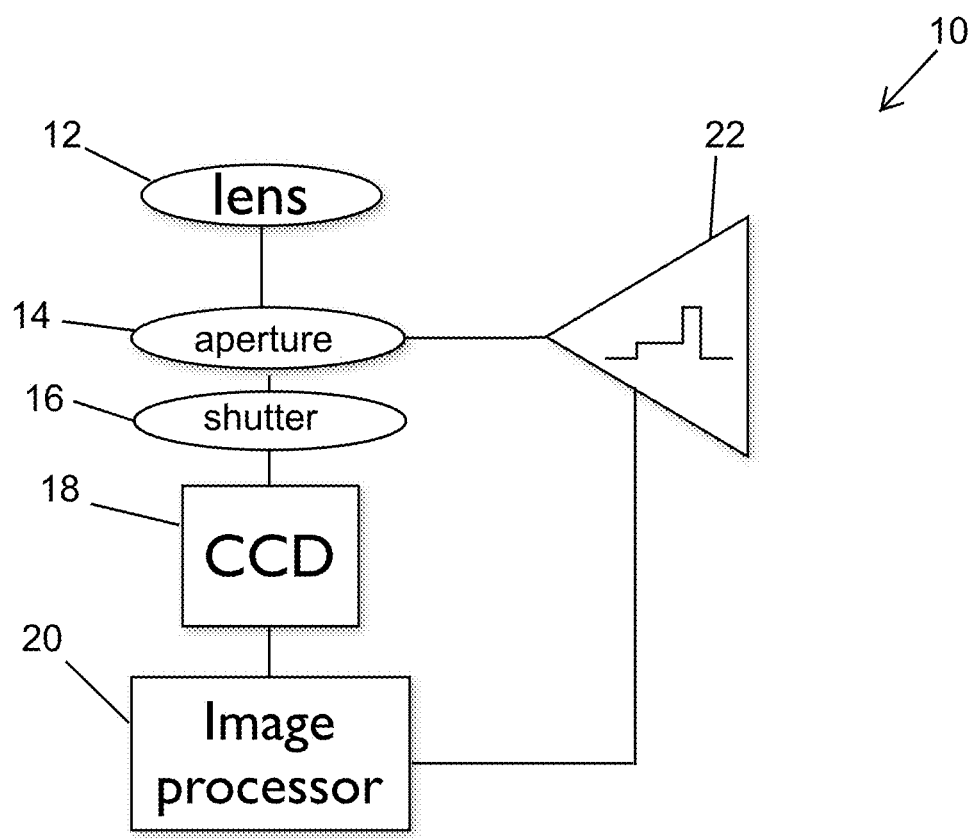
FIG. 1 is a schematic of a camera system according to a first embodiment.

FIG. 1 schematically shows one embodiment of a camera 10 in accordance with one embodiment of the present invention. The camera 10 includes a lens 12 in front of an aperture 14. The camera 10 further includes a shutter 16 and CCD 18 ("CCD" is used generically to mean any technology of image capture, such as CMOS, CCD or other sensors for converting light to electronic signals). An image processor 20 (cpu) receives the electronic signals representing the image captured by the CCD 16.

Although shown in greatly simplified form, these components are intended to be as is generally known with the exception of the control of the aperture 14. In FIG. 1, the camera 10 is in a special mode that can be selected by the user for providing desired motion blur. In this mode, the aperture 14 of the lens 12 receives an input function 22 controlled by the image processor 20. The input function 22 opens the aperture 14 a small amount initially, during most of the exposure. Then the input function 22 opens the aperture 14 much wider briefly at the end of the exposure. Of course, the aperture 14 cannot change from one setting to another instantaneously. Some slope on the change in aperture 14 is acceptable, but faster is better. The much wider aperture period is preferably less than one-fifth of the total exposure time, and more preferably less than one-tenth of the total exposure time. Optionally, the ratio of the time of the much wider aperture opening to the total exposure time is user-adjustable. The desired ratio will depend on the speed of the action that is being photographed.

Thus for an exposure during which the desired motion blur input function 22 is selected by the user, the moving object (such as a ball, car or person) will be moving during the initial, longer period in which the aperture is open a lesser amount, creating a blur in the image received by CCD 18. During the period in which the aperture is opened wider, more light is being passed onto CCD 18 in a much shorter period of time, so a clearer, brighter, higher-contrast image of the object appears at the end of the blurred portion of the image. As known with rear-curtain sync, this provides the desirable effect of a clear image of the object with motion blur trailing behind the object.

Figure 2:
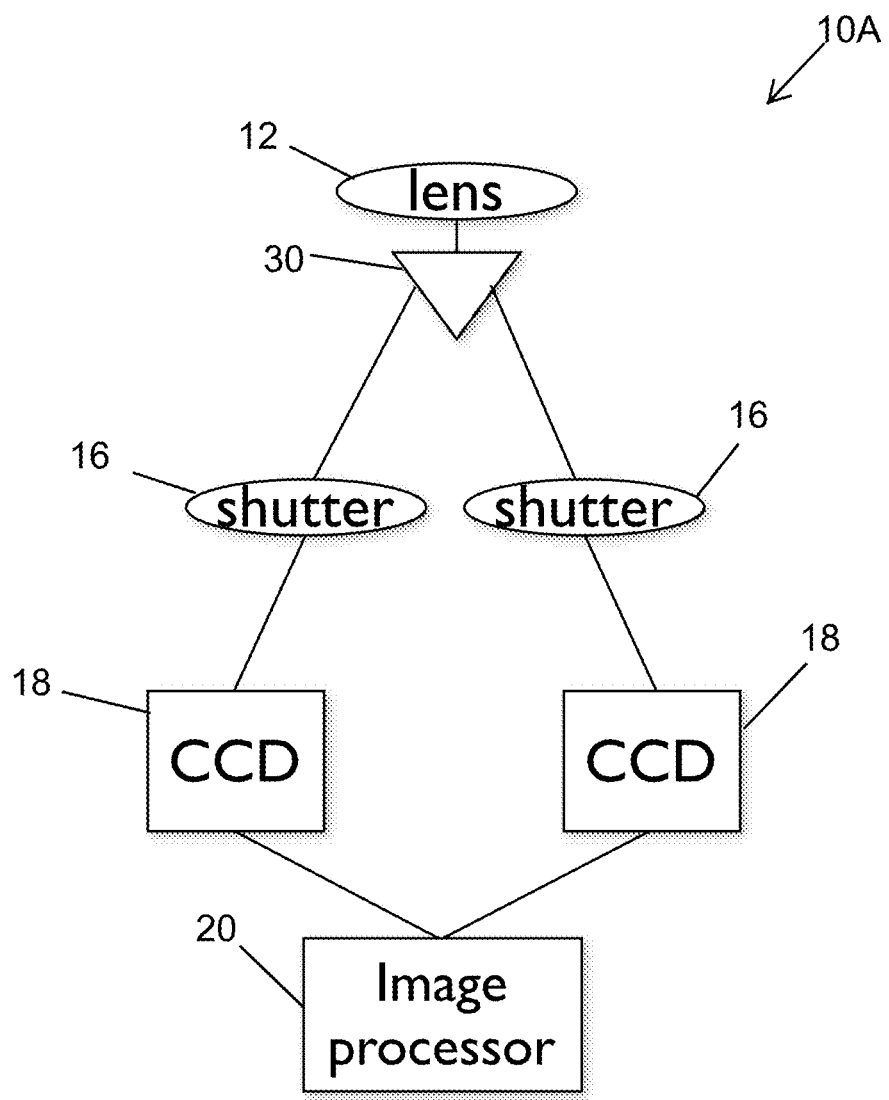
FIG. 2 is a schematic of a camera system according to a second embodiment.

FIG. 2 shows a camera 10A according to second embodiment of the present invention. The camera 10A also can selectively provide desired motion blur effect in images, as well as some other effects. The camera 10A includes several components of the first embodiment, which retain the same reference numerals, including a lens 12 and image processor 20; however, camera 10A includes two shutters 16, each in front of one of two CCDs 18. A prism 30 is arranged between the lens 12 and the two shutters 16 so that the same image from the lens 12 passes through both shutters 16 and onto both CCDs 18 simultaneously.

In operation, when the desired motion blur effect is selected by the user, the CCDs 18 are set to different sensitivities (e.g. ISO settings) and the shutters 16 are set to different shutter speeds that correspond to their respectively associated CCDs 18 (i.e. the slower shutter speed would have a lower ISO setting and the faster shutting speed would have a higher ISO setting). One shutter 16 is set to a slower shutter speed and the other shutter 16 is set to a much faster shutter speed. Again, the amplification of the light is set in each of the CCDs 18 to provide a good image from each shutter 16. The slower shutter 16 is open for the entire exposure and the faster shutter 16 is open only at the very end of the exposure, with both shutters closing again simultaneously (or nearly so). Alternatively, the slower shutter 16 closes during the time that the faster shutter 16 is open.

Two images are thus provided to the image processor. A first image from the slower shutter 16 provides motion blur of the object in motion. The second image provides a sharp, higher-contrast image of the object in motion, positioned at the end of the motion blur of the object in the first image. The image processor 20 combines the two images to provide a single image with the desired effect of the motion blur trailing behind the clear, high-contrast image of the object. This level of image combination is well-known and is provided by several existing in-camera processors.

Alternatively, instead of adjusting the amplification of the CCDs 18 differently, a neutral density filter could be provided in the light path of the slower shutter 16 (between the prism 30 and the shutter 16 or between the shutter 16 and the CCD 18). The neutral density filter is preferably at least several full stops (e.g. three full stops). An electronically adjustable neutral density filter could also be provided so that the difference in shutter speeds between the two shutters 16 can be adjustable (either by the user or automatically by a computer processor).

Figure 3:
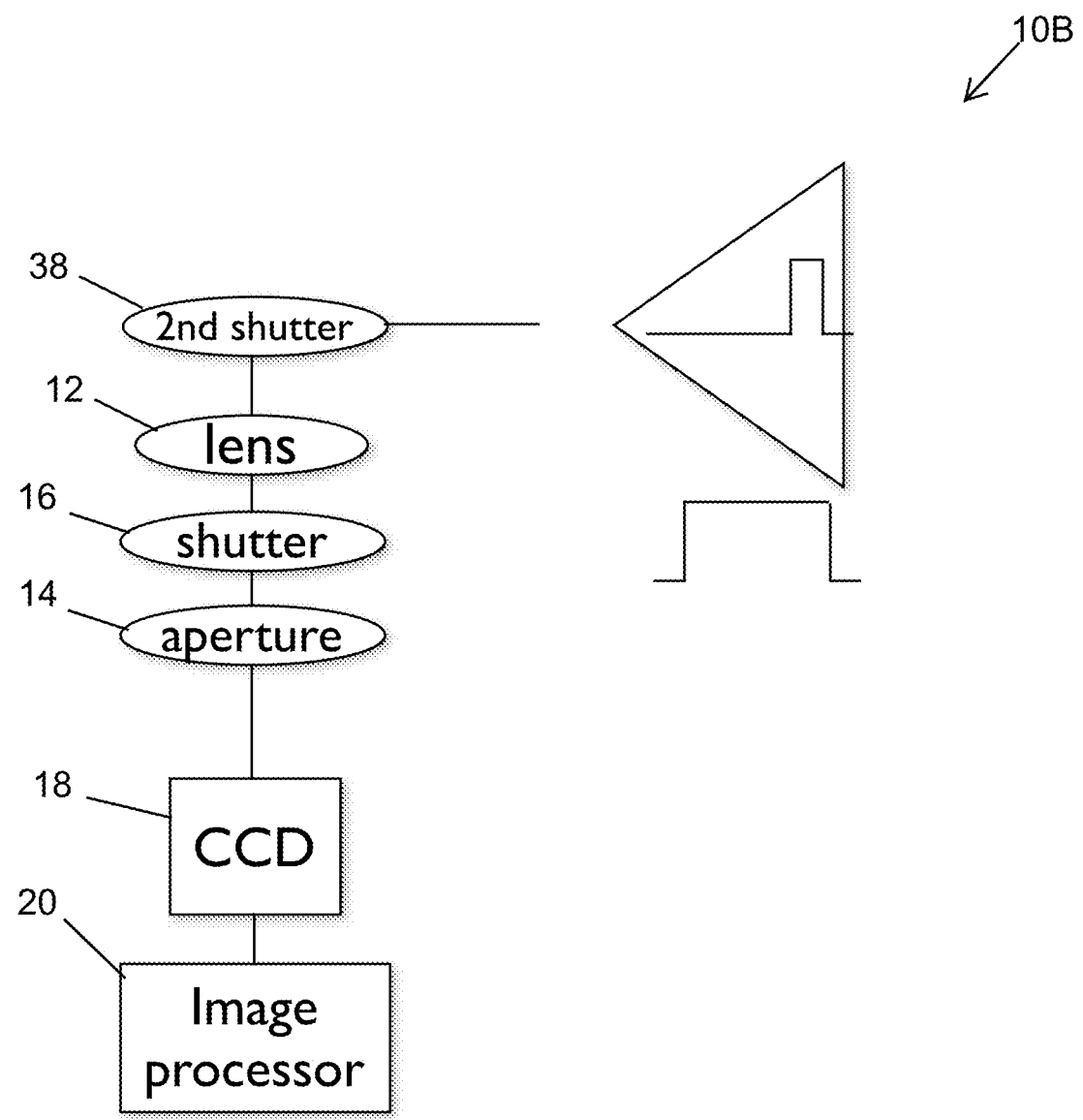
FIG. 3 is a schematic of a camera system according to a third embodiment.
Figure 4:
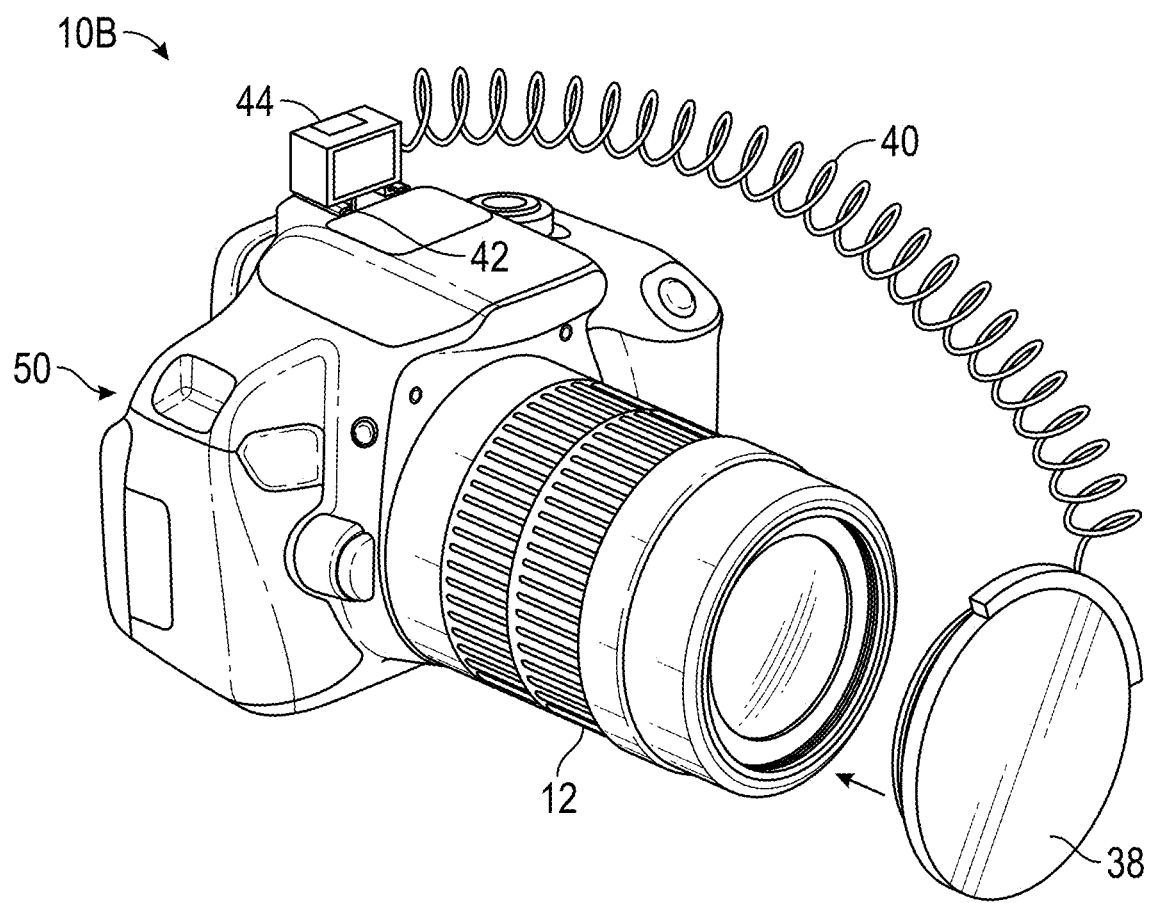
FIG. 4 is a perspective view of the camera system of FIG. 3.

A camera system 10B according to a third embodiment of the present invention is shown schematically in FIGS. 3 and 4. In this embodiment, the lens 12, shutter 16, aperture 14, CCD 18 and image processor 20 are all as is known in an existing digital camera 50 that has a capability of providing a rear-curtain sync function with a flash (for example an Nikon D700 or D80).

Additionally, in this embodiment is provided a second shutter 38 that is in the form of a lens cap or lens filter, such that it snap-fits or is threaded (or otherwise connected) to the front of the lens 12. The second shutter 38 is also connected by a cable 40 to the existing external flash connector 42 ("hot shoe") of the camera (e.g. via a battery pack 44 mounted to the connector 42). The second shutter 38 may report itself to the camera 50 through the connector 42 as an external flash. As far as the camera 50 (and its internal computer processor) is aware, the camera 50 is connected to an external flash (which is actually the second shutter 38). The second shutter 38 is an electronically adjustable neutral density filter that is capable of changing from a highly-filtered state to a non-filtered (or minimally filtered) state very rapidly. The second shutter 38 may function similarly to an electronic shutter, except that it allows some light to pass through it when "closed" instead of no light. Thus, when the camera 10B takes its exposure readings, it takes it through the multiple-stop neutral density filter of the second shutter 38 (e.g. a three-stop or four-stop neutral density filter). The user selects the existing rear-curtain sync function on the camera (e.g. via a menu on a rear display of the camera). Since the camera 10B believes it is connected to an external flash, the camera 10B sets a relatively long shutter speed to capture some motion blur and then fires the "flash," which in this case actually operates the second shutter 38 to open at the end of the exposure, thus increasing the light by multiple stops. This provides the desired motion blur effect, with the blurred image of the object trailing behind the clear, high-contrast image of the object.

This embodiment of the camera 10B has the advantage that it is provided as an accessory to be used with existing cameras. Several embodiments are described below that can be provided solely with existing camera hardware solely with image processing software, either on-camera or on a computer after the images are transferred to the computer. Of course, combinations of the above-described hardware and below-described software could also be used, not only for trailing motion blur but for other effects as well.

Figure 17:
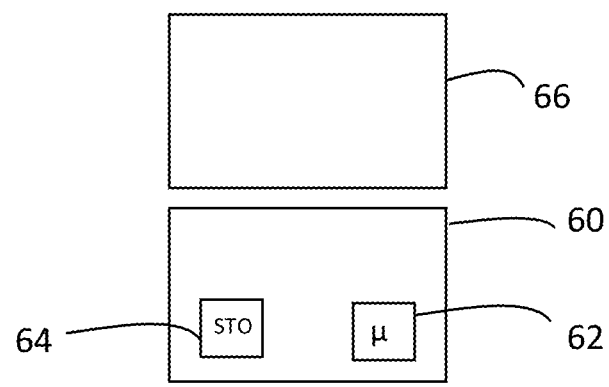
FIG. 17 is a schematic of a general purpose computer that could be used to perform the method illustrated by FIGS. 5-16.

In another embodiment, the motion blur effect (or other effects) is provided by taking multiple images (such as from FIGS. 1-3) and then processing them. The processing could occur on-camera, using on-camera image processor 20 (FIGS. 1-3), or on a general purpose computer 60 (FIG. 17) having a processor 62 (general microprocessor and/or dedicated graphics processor), storage 64 (e.g. RAM, hard drive, or other electronic, magnetic and/or optical storage) and display 66.

It is common in digital photography for images to be stored as a series of numbers arranged in an array, such that each pixel of the image is given a number value assigned to its location in the image. The number values correlate to particular color hues, with all available color hues having distinct number values. When the image number array is referenced for display, the appropriate color hue associated with each number value will be displayed at the corresponding pixel location, and the image will be faithfully recreated.

It is important to note that in actual digital photography, three separate arrays may be used to store the color value of the image pixels, correlated to each pixel's value in either the red, green, or blue primary light color spectrum. Also, what is referred to color hue above may encompass a combination of a color's hue, tint, shade, brightness, lightness, colorfulness, chroma, and/or saturation. The techniques of this method apply not just to color images but to black and white or monochromatic images as well, as the color value of each pixel can be stored as a number value in an array correlated to that pixel's value in a monochromatic scheme.

The specific details of the qualities associated with an image's color palette are not important to this method, beyond the understanding that digital images can be stored as an arrayed series of numbers correlating to pixel values, and those values can be manipulated to change the appearance of the original image.

This method relies on the ability to photograph a series of images taken in rapid succession. Many modern digital cameras already possess this ability, and when the photos are taken of a moving body the resulting images will differ from one another only in the amount that the subject moved across the viewing angle. Stated more simply, when laid side-by-side the individual images would resemble pages torn from a flipbook animation, as the differences between successive images may be slight but the difference between the first and last may be greater.

It may also be possible to create the image series necessary for this method by utilizing individual frames from a video source. If conventional movie film were used, then successive frames could be stored as a digital images and the collection of those digital images could be used for this method. If digital video were to be used for this method, then screen shots from successive moments in time could be used as the required digital images.

Any single digital image can be stored as a two-dimensional array, image1[x][y], with each pixel's number value being associated to that pixel's position in the image at row x and column y. For a series of images each could be stored as its own two-dimensional array, image1[x][y], image2[x][y], image3[x][y], etc., or the series could be stored with each image being in its own z position in a three-dimensional array, imageseries[x][y][1], imageseries[x][y][2], imageseries[x][y][3], etc. For simplification of describing the algorithms involved in this method the series of images will be referred to in this manner as a three-dimensional array, with the general nomenclature of array1[x][y][z].

Figures 5, 6, 7:
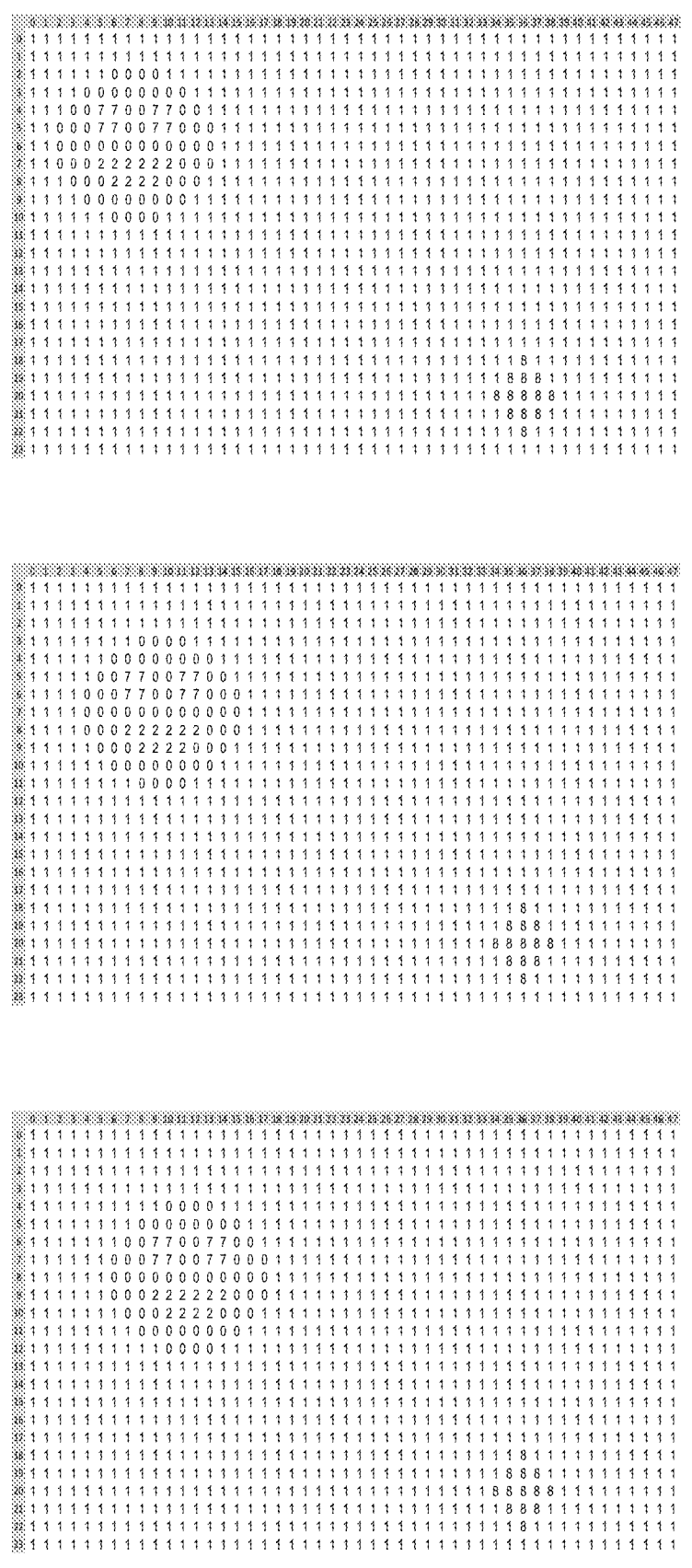
Figures 8, 9:
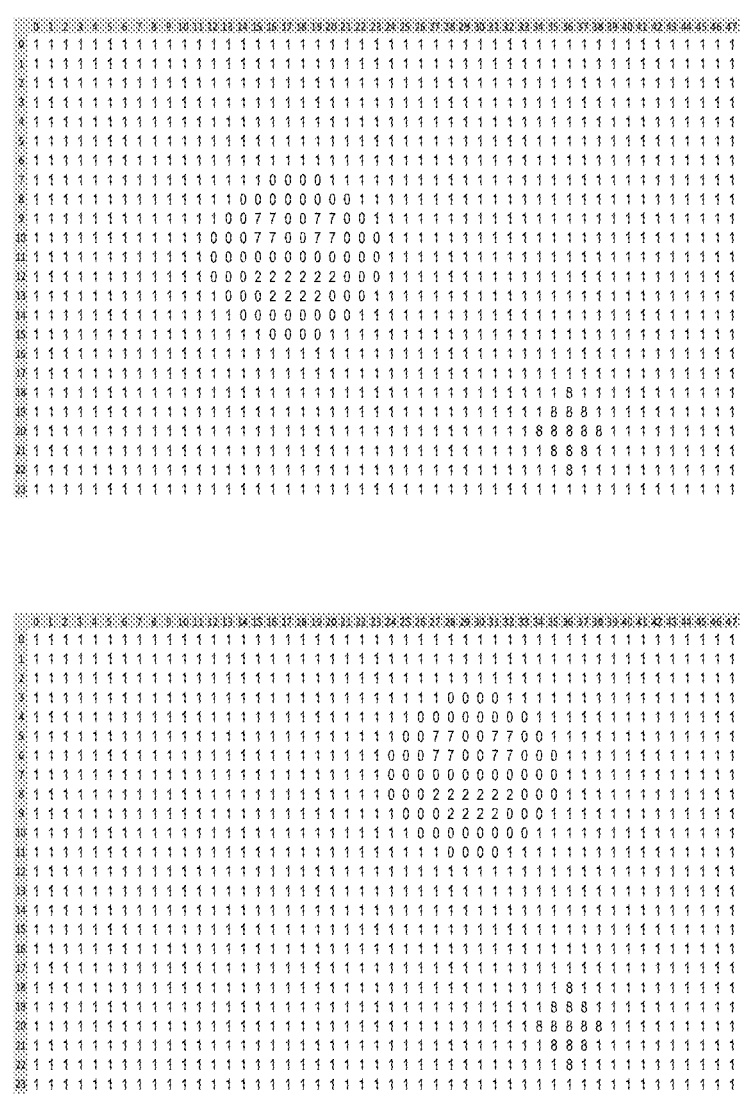

An example of how an image can be stored as an array is shown in FIG. 5. In this case, the image is actually is constructed from an array of integers with numerals acting as individual pixels within each image. A partial representation of an example image series is shown in FIGS. 5 through 9. In this particular image series, the background is depicted by a field of numeral 1s, along with a small diamond pattern of numeral 8s in the lower right corner. The moving body is depicted as a circular shape depicted by the numerals 0, 7, and 2. Along the top and the left of each image is a gray band with numerals identifying the column and row positions, respectively (24 rows and 48 columns).

The first step in the method is to execute a "smear function". The output of the smear function will be an entirely new single image array which when recreated for viewing will appear to have a crisp recreation of all pixels common to the images in the series, along with a blending of the pixels whose number values change from image to image. The intensity of this blending can be adjusted within the smear function by the use of a variable hereto known as the "smear factor". In general, the output image array of the smear function, hereto known as the "smeared array", would resemble a photographic image taken with a long exposure.

The basic structure of the smear function is based on an iterative loop sequence which compares the corresponding pixel number values of successive images in the series and writes a number value to the smeared array in the same pixel location. If a pixel number value in a particular location of one image array is equal to the corresponding pixel number value in the same location of the next successive image in the series, then that same number value will be written to the same location in the smeared array. If the pixel number values differ in the same location between successive image arrays, then one or the other of the compared pixel number values will be written to the smeared array. In this case, the choice of which pixel number value to write to the smeared array is dependent on a selection algorithm within the smear function. One algorithmic method for making this choice is to use a simple counter, hereto known as the "smear counter", that increases with each loop iteration, and the decision on which pixel number value to write to the smeared array is made by the referencing the value of the counter and using it in a decision function (for example, if the counter is even select the value from the former image in the series, and if it is odd select the value from the latter).

After the first loop iteration compares the first and second images of the series, an initial smeared array will be created that contains all of the common pixels of those two images along with a blending of the pixels which do not match. If the loop sequence were continued solely as described in the above paragraph, then with each successive comparison of two sequential image arrays the altered pixel number values in the preexisting smeared array could be overwritten by the selection algorithm. This would have the net effect of only comparing the last two images in the series. To resolve this issue and ensure that the smeared array contains pixel number values from each image in the series, the smear function has to keep track of which pixel locations in the smeared array have been chosen by the selection algorithm to be different from the pixel number values of the former of the images in the sequence, and it has to ensure that those specific pixel locations cannot be further changed by the smear function. This can be achieved by adding an additional dimension to each member of the smeared array or by creating an extra array parallel to the smeared array, whose values tell the selection algorithm whether a particular pixel location is to be protected from further alteration, hereto known as the "protection array".

For example, a basic smear function loop sequence may look like this:

array1[24][48][14]—Acts as a series of 14 two-dimensional arrays, each having 24 rows and 48 columns In this case, 12 images are being read into the program to be compared, each of which has 24 pixel rows and 48 pixel columns (per the conventions of the C programming language, zero is an available element location. These 12 images will be saved in locations array1[x][y][0] through array1[x][y][11])

The 13$^{th}$ array will contain values which denote whether a specific pixel location in the smeared array is to be protected from further alteration (the protection array in location array1[x][y][12])

The 14$^{th}$ will be the output array of the smear function (the smeared array in location array1[x][y][13])

--- sf - Is number variable whose value is the smear factor
a - Is number variable used as a counter
Earlier in the program, all values in array1[x][y][12] are set to 4
sf = 5;
a = 1;
for (z=1;z<13;z++){
    for (x=0;x<24;x++){
        for (y=0;y<48;y++){
            if (array1[x][y][z] != array1[x][y][z−1] && a == 1 && array1[x][y][12] != 10){
                array1[x][y][13] = array1[x][y][z−1];
                array1[x][y][12] = 10;
            }

```
        else {if (array1[x][y][12] != 10) array1[x][y][13] =
array1[x][y][z-1];
        }
            if(a == sf) a = 1 ;
            else a = a + 1 ;
        }
    }
}
```

In the above example, each iteration of the "for (z=1; z<13; z++)" loop acts as a comparator of two successive images in the series at locations array1[x][y][z] and array1[x][y][z-1] for all x values (0-23) and y values (0-47). In this case, array1[x][y][z-1] is the former of the images in the series and array1[x][y][z] is the latter. For each [x][y] location in the smeared array (array1[x][y][13]), the value will be equal to that of the former of the images in the series unless each of three conditions is met:

1. The pixel number values are not equal in the same [x][y] location for the two compared image arrays (array1[x][y][z] !=array1[x][y][z-1]). This is the most basic element of the smear array, as it checks to see if the corresponding pixel number values between successive image arrays differ.

2. The counter function is equal to a particular value (a==1). A smear counter is incorporated in the "for (y=0; y<48; y++)" loop sequence in the form of an if-then-else statement (if (a==sf) a=1; else a=a+1;). This simply adds 1 to the value of a until a equals the value of sf (the smear factor) at which point the value of a is reset to 1. If the smear factor is given the value of 1, then the conditional statement a==1 would be true in every case and when the first two images of the series are compared all of the differing pixel number values of the latter image would be written to the smeared array and none of the former image pixel number values would be seen in the smeared array. If the smear factor is given a value of 2, then when the first two images of the series are compared every other differing pixel number value would be selected from the former image and then the latter image. If low smear factor values like 1 or 2 are used, then as the smear function progresses through successive images in the series fewer of the latter image pixel number values would be written to the smeared array and the resulting image would have an uneven blending which favors the earlier images in the series. By having the ability to change the smear factor, the smear function can be adapted to give the most desired blending for the images in the series. In the case above, a smear factor of 5 is used. Thus, for every 5 dissimilar corresponding pixel number values, only one is written to the smeared array (presuming it meets the other selection criteria).

Figures 10, 11, 12:
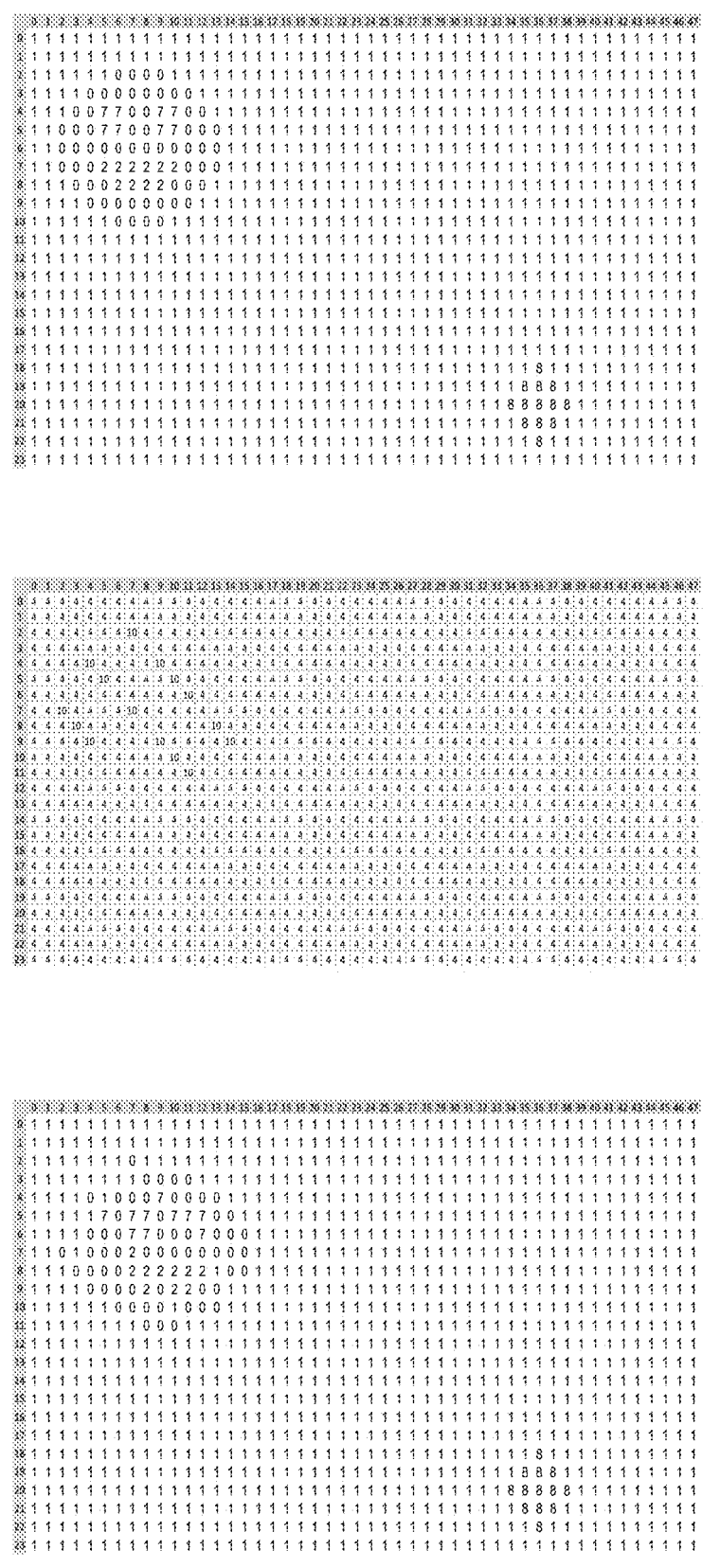

3. The pixel location protection array is not equal to a particular value (array1[x][y][12] !=10). Earlier in the program, all of the values in the protection array are set to the arbitrary value of 4. So when the first two images of the series are compared, all dissimilar corresponding pixel number values are available to be written to the smeared array. An example of the smeared array after one iteration of the smear function is shown in FIG. 10. As dissimilar corresponding pixel number values are chosen by the selection function to write the former image values to the smeared array, an arbitrary value of 10 is assigned to the corresponding pixel location in the protection array (array1[x][y][12]). An example of the protection array after one iteration of the smear function is shown in FIG. 11. When the selection function is moving through successive images and recognizes dissimilar pixel number values it checks the value of the corresponding pixel location in the protection array. If that value is 10, then it skips writing any new value to the smeared array. This is achieved through an additional if statement added to the else condition of the selection function (if (array1[x][y][12] !=10) array1[x][y][13]=array1[x][y][z-1];). For example, in FIG. 11 the value at position row 2, column 7 is 10, therefore the pixel value at the same location in FIG. 10 (0) will remain unaltered for the duration of the smear function process. By contrast, in FIG. 11 the value at position row 2, column 8 is 4, therefore the pixel value in the same location in FIG. 10 (0) is free to be altered by the continuation of the smear function process.

As the code is written in the above smear function, the pixel number values from the former image will always be written to the smear array unless there is a value of 10 for a particular location in the protection array (FIG. 11). Because of this decision method, the smear array generated by the first iteration of the smear function (FIG. 10) will be identical to the first image in the series (FIG. 5). The protection array however, will have certain pixel location tagged with the number 10, and as successive iterations of the smear array are run those will be the only locations which are not overwritten. For example, in position row 7, column 7 in FIG. 11 there is a value of 10, and the corresponding protected value in FIG. 10 (2) is retained in the same location in the second iteration of the smear function (FIG. 12). It would be possible to write this function where only pixel number values from the latter of two successive images where to be written to the smear array either when those number are found to be equal or unequal. This change would create different patterns of retained pixel number values in the smear array.

The example smear function above uses ascending loop sequences, and thus the images in the series are compared to one another in ascending order. Additionally, the individual pixel number values are compared in an ascending order from the first row to the last and the first column to the last. If only this one basic smear function is used, it is likely that geometric patterns will emerge in the blended areas of the smeared array image because of the iterative nature of the function.

One method to alleviate possible recognizable patterning of the smeared array would be to use a series of smear functions, with each one comparing the successive images in different orders of ascending and descending loop sequences. For example, in the above example the rows of successive image arrays are compared in ascending order from 0 to 23 using the "for (x=0; x<24; x++)" algorithm. This could be changed to a "for (x=23; x>=0; x--)" algorithm and the rows would be compared in descending order from 23 to 0. When applied to the three for loops in the smear function (x, y, and z counters), alternating the sequence of ascending and descending linear counters would allow for eight separate distinct smear functions. By combining the results of all, or any number, of these individual smear functions into one single smeared array, variations of geometric patterns could be achievable in the smeared array image (presumably from unnoticeable to very noticeable).

Conceivably, the loops used to step through the comparisons of pixel array values would not necessarily have to progress in a linear nature (ie., 1, 2, 3, as done by the x++ operator), but they could progress in an order dictated by a mathematical function or additional algorithm. This may be done to save processing time or memory storage requirements, or to further alleviate geometrical patterning in the smeared array.

Another way to alleviate geometrical patterning in the smeared array may be to use a varying smear factor value rather than a constant. It is possible that the smear factor value could be the product of a mathematical function or additional algorithm that references properties of the images themselves. This again could be done to save processing time or memory storage requirements.

In the smear function methods described above, images are compared to one another in order of succession and the function determines which pixel number values to output to the smeared array. With this first step through the smear function an initial smeared array is created and it grows closer to an accurate blending of all images in the series with each image comparison. It may also be possible to achieve the same or similar effect not by comparing successive images, but by comparing each image to the smeared array as it develops though each iteration.

Regardless of the exact algorithms, the process performed by the smear array can be summed up into three parts: 1. Compare corresponding pixels between images in a series, 2. Decide which pixels should be represented in the final aggregate image, and 3. Ensure that as the process carries out, the pixels intended to remain the aggregate image are unaltered.

Figures 13, 14, 15:
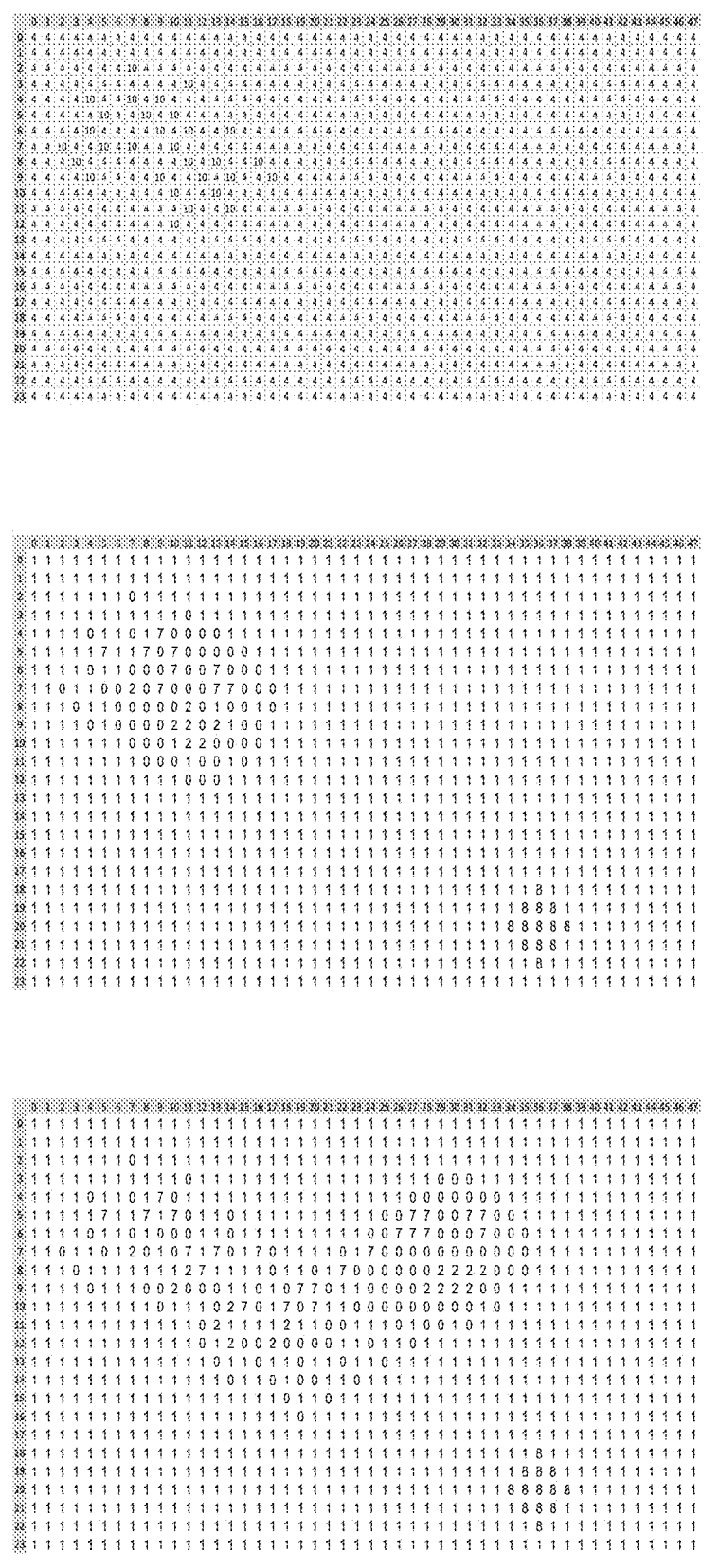

The second step in this method for simulating second curtain sync is to overlay a clear image of the moving objet(s) on top of the smeared array, hereto known as the "(final position) overlay function". As mentioned before the smeared array would appear just like a photograph taken with long exposure when recreated as an image, and thus it would not yet give a clear view of the moving object(s) in its final position. For example, although many of the pixels representing the moving body in FIG. 15 are matching those of the last image in the series, FIG. 9, it can be seen that many pixel values from all other images in the series are present as well. For example, the pixel value in position row 6, column 26 is 7 in FIG. 15, although that does not correspond to the same pixel value in the final image of the series, FIG. 9.

The way that this method creates the final position image overlay is by comparing the pixel number values of the final image in a series to those of two other image arrays within the series. In order to reproduce a clear image of a moving subject the overlay function cannot perform any kind of blending or smearing of pixel number values. Therefore it is critical to the method that all of the pixel number values associated with the moving subject in its final photographed position be written to the array associated with the final "second curtain sync" image, hereto known as the "overlaid array".

Because a function looking for differences between two arrays will only be able to identify different pixel number values but not actually know which preceded which in the movement of an object, it would not work to simply compare the last image of a series to the first and keep the differing pixel number values from the latter image. That would not only give a clear view of the object in its last position, but it would also write background pixels from the final image over the pixels from the first position and any other pixels in the smeared array that were blended over the original position of the object. However, by comparing the final image to two other images in the series and only keeping the pixels from the final image that are different than both, the overlay function will only keep the pixel number values from the moving object(s) in its final position. Presumably, the overlay function would be most effective if comparing the final image in a series to the most dissimilar images possible from it and one another. So, it would likely be best to compare the final image to the first and one closest to the middle of the series (ie. for a 9 image series, compare image 9 to images 1 and 5).

For example, a basic overlay function loop sequence may look like this:

array1[x][y][0]—Is the first image array in a series (x and y are the arbitrary first two dimension locations)

array1[x][y][5]—Is an image array near the middle of the series array1[x][y][11]—Is the final image array in the series array1[x][y][13]—Is the resultant array from the smear function, whether the product of a single stage smear function or the aggregate of a multi-stage smear function

```
for (x=0;x<24;x++){
    for (y=0;y<48;y++){
        if ( array1[x][y][11] != array1[x][y][0] && array1[x][y][11] != array1[x][y][5] ){
            array1[x][y][13] = array1[x][y][11];
        }
    }
}
```

Figure 16:
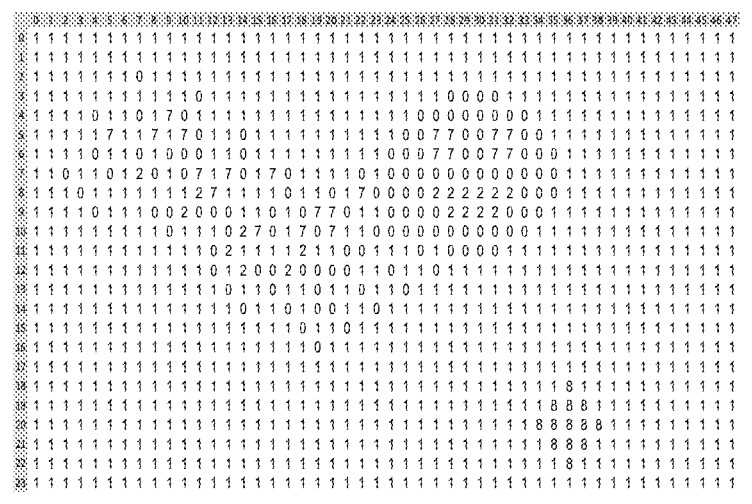

In the above example, each iteration of the "for (x=1; x<24; x++)" loop acts as a very simple comparator of the last image in the series to the first and one near the middle of the series, for all x values (0-23) and y values (0-47). When it recognizes that a pixel number value on the last image of the series (FIG. 9) differs from those in the same pixel location in both the first (FIG. 5) and the sixth (FIG. 8) image arrays, it writes the pixel number value in that location on the smeared array. This process will eventually transform the smeared array into the overlaid array (FIG. 16), by overwriting all of the pixel number values associated with the moving object in its final position directly over whatever pixel number values may have been on the smeared array in those same pixel locations. For example, in FIG. 9 the pixel value in row 6, column 26 is 0, and the value of 7 that had previously been in that location in the smeared array (FIG. 15) is changed to a value of 0 by the overlay function as it creates the overlaid array (FIG. 16). This overlaid array will then contain all of the pixel number values which when reproduced as an image will be the desired second curtain sync effect image.

In both the smear function and overlay function described above, pixel number values are compared to identify if they are precisely equal. In actual use, it may be necessary to apply a "variation factor" which would in effect add a tolerance to the pixel number value comparisons. Because of the slight variations that may exist between images of the same subject taken in rapid succession, it's possible that individual pixel number values may differ slightly in spite of representing the same object. By having a tolerance in the value comparisons, it may be possible to counteract those slight variations in an effective manner.

Further, in the functions as previously described, pixel number values are individually compared between successive images. It is conceivable that groups of pixel number values could be compared with each loop step rather than just two, in an effort to either save processing time or data storage requirements.

As previously stated, the processing methods described above made use of a single 3 dimensional array and all number values required were stored in that array. It is possible that a series of 2 dimensional arrays could be used in similar fashion, with each image being represented as a single 2 dimensional array. Further, the smeared array, protection array, and overlaid array would each be represented as a 2 dimensional array.

It is further conceivable that the methods described above could be used to compare a series of 3 dimensional images. To achieve this, each image could be stored as a 3 dimensional array and the series of arrays compared to one another with the use of additional comparison loops in the smear and overlay functions to account for the extra dimension of the images. Or, the series of images could be stored in a single 4 dimensional array with $4^{th}$ dimensional values being used to designated each individual image array and the smeared, protection, and overlaid arrays.

Conceivably, it would be possible to use two separate image capture devices (cameras) to create the desired second curtain sync effect. The first camera could capture a series of still images of a moving object, while a second camera captures a long exposure image of the same object for the same period of time. Instead of using the resultant of the smear function process, the overlay function could actually overwrite the long exposure image with specific pixels chosen from the last image in the series from the first camera.

The method as described above will generate an image with the second curtain sync effect. Variations of this same method could be used to generate other photographic effects. For example, if the overlay function is changed to give priority to the first image in the series so that pixel number values correlating to the moving object in its original position are written to the overlaid array rather than those from its final position, then the resulting image will show a clear view of the object in its original position and a blurred representation of the object leading to its final position. This will be the equivalent of a first curtain sync effect. By adjusting the overwriting priority of the overlay function to other images in the series, additional effects could be produced where a blurred representation of the moving object trails both behind and in front of a clear view of the object in the middle of its range of movement. Similarly, the overlay function could be run multiple times with overwrite priority given to different images in the series each time. The resulting image could show clear views of the moving object in multiple positions along its path of movement, with blurred representations of the object joining them.

Another interesting variation of this method could be created by continuing to display the smeared array image as the smear function progresses. The resulting display would appear like a video of a moving objet(s) but only as a blurred representation of the object as it moves. If an overlay function were utilized to produce a clear view of the moving object(s) in its final position, then the resulting video would appear to show the object(s) streaking to that position. Conceivably, a similar method could be used to show a clear view of a moving object(s) in its original position with a blurred representation of the object progressing toward its direction of travel. A combination of methods could create a video that shows an object(s) in a clear first position, a blurred representation of the object moving in the direction of motion, and then a clear view of the object in its final position.

Figure 18:
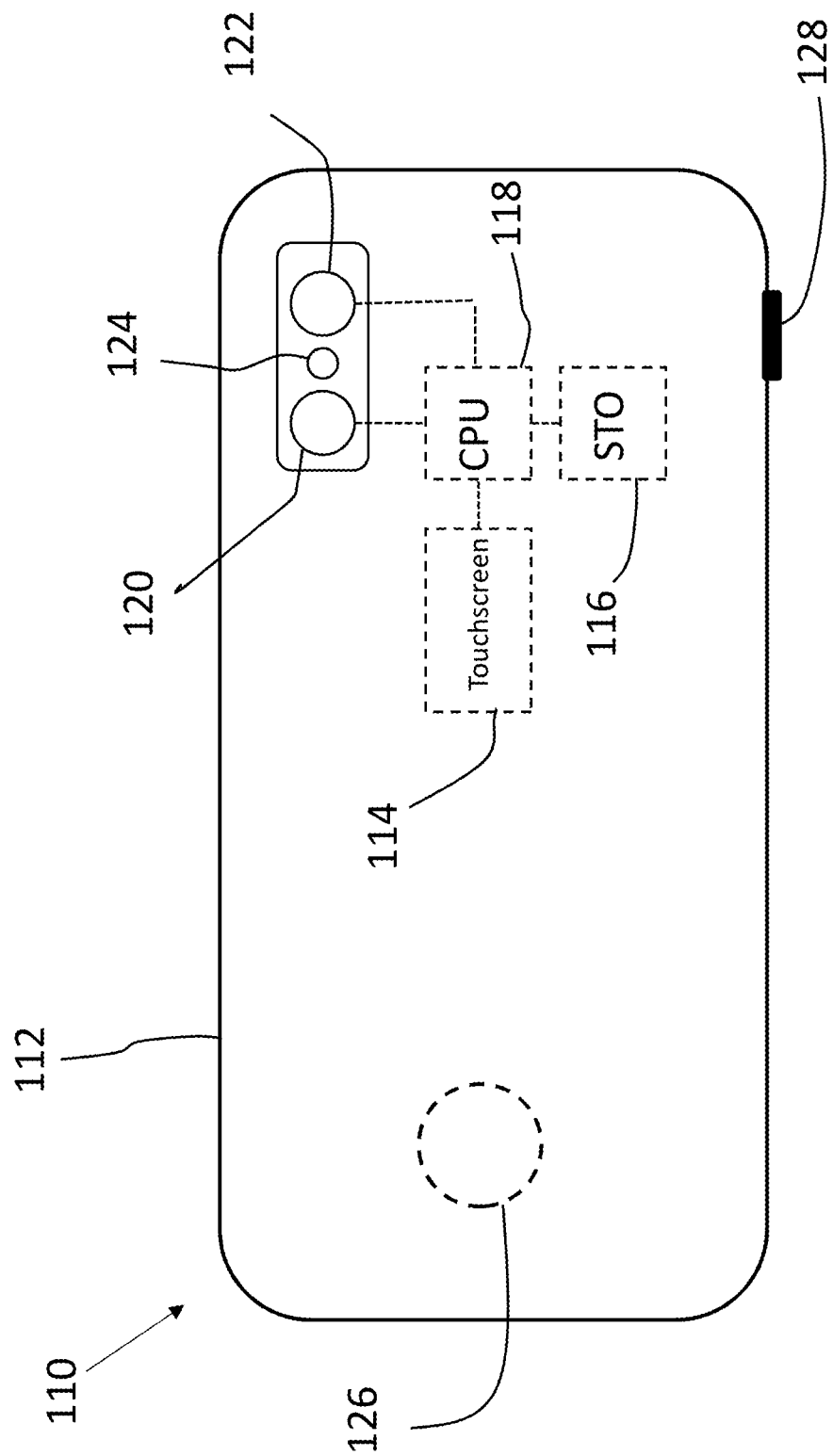
FIG. 18 shows another embodiment of the camera system, implemented in a smartphone.

FIG. 18 shows another embodiment of the camera system 110, implemented in a smartphone 112, for example an iPhone X. The smartphone 112 includes a touchscreen 114, which is shown schematically in FIG. 18, but occupies nearly the entire front side of the smartphone 112, shown in FIGS. 19-21. The smartphone 112 also includes storage 116 and processor 118 (which may include multiple processors and/or cores). The smartphone 112 also includes dual cameras 120, 122 and a flash 124. The cameras 120, 122 are capable of taking concurrent or nearly-concurrent images based upon a single activation by the user, which could be based upon a GUI button 126 on the touchscreen 114 and/or a hardware button 128 on the smartphone 112. In the example smartphone 112 (again, using the example of an iPhone X), one camera 120 has a wide-angle lens, while the other camera 122 has a telephoto lens. As will be explained below, the smartphone 112 with dual cameras 120, 122 can be used to generate the trailing blur in a manner similar to the embodiment of FIG. 2.

Figure 19:
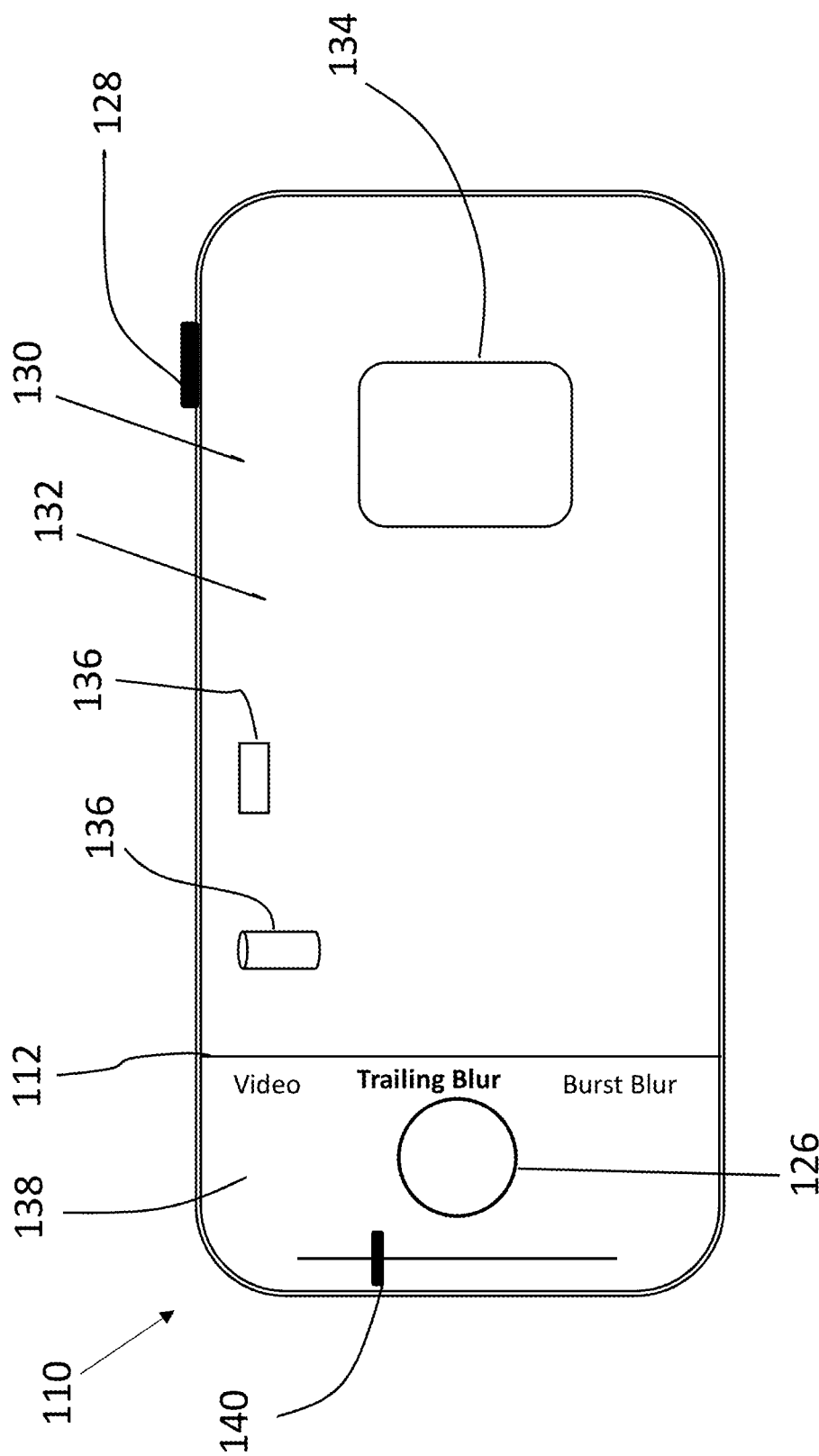
FIG. 19 shows a first user interface screen of the camera system of FIG. 18 for capturing an image.

FIG. 19 shows a first user interface screen 130 of the camera system 110 of FIG. 18 for capturing an image. The screen 130 displays a viewing portion 132 which displays in real time the image from the telephoto camera 122. In the example scene shown, there is the subject 134 in motion (a person, animal, object, etc—of course there could be more than one subject 134 in motion) and some stationary or relatively stationary background objects 136. The screen 130 also displays a control portion 138, which includes a mode selection feature, which in the example shown includes "video," "trailing blur," and "burst blur." "Video" is standard video capture, not the subject of this invention. "Trailing blur" will be described first and in the example screen 130, "trailing blur" is selected.

An optional slider control 140 is provided to adjust the blur speed (e.g. in terms of exposure time or shutter speed), which will depend on the speed of the subject 134 in motion. The user may want a blur that is smaller than the size of the subject 134 or the user may want a blur that is several times larger than the size of the subject 134.

In capturing an image, when trailing blur is selected by the user, the shutter speeds of the cameras 120, 122 are set to different speeds (e.g. one is at least ⅔ stop to 2 stops faster). As explained above with respect to FIG. 2, the sensors may be set to different sensitivities (e.g. ISO settings) in order to achieve proper exposures. Alternatively, the apertures may also be adjusted to provide proper exposures, or the ISO and aperture settings can both be set differently in the two cameras 120, 122. In one example, the wide-angle camera 120 is set to a slower shutter speed (and correspondingly lower ISO and/or higher f-stop) and the shutter speed of the telephoto lens camera 122 is set to a much faster shutter speed (and correspondingly higher ISO and/or lower f-stop).

The shutter of the wide-angle camera 120 is open beginning when the user presses the shutter release (e.g. either the GUI button 126 or the hardware button 128), and the telephoto lens camera 122 is open toward the end of that exposure. The shutters of both cameras 120, 122 may close simultaneously or nearly so to provide complete or significant overlap of the two images. Alternatively, the shutter of the wide angle lens camera 120 closes during the time that the shutter of the telephoto lens camera 122 is open to provide only partial overlap.

The two images are then provided to the processor 118. A first image from the longer exposure wide-angle lens camera 120 provides motion blur of the subject 134 in motion. The second image from the short-exposure telephoto lens camera 122 provides a sharp, higher-contrast image of the subject 134 in motion, positioned near the end of the motion blur of the subject 134 in the first image. The processor 118 may automatically combine the two images to provide a single image with the desired effect of the motion blur trailing behind the clear, high-contrast image of the subject 134.

Since the telephoto image will cover less area than the wide-angle image, only a portion of the wide-angle image will be used. The processor 118 aligns the overlapping portion of the wide-angle image with the telephoto image (for example, based upon the positions of the background objects 136). The processor 118 may automatically identify the highly-blurred portion of the long-exposure image and only combine the motion blur of the subject 134 with the telephoto image and ignore any sharp portions of the long-exposure image (including background objects 136). This may all be performed automatically by the processor 118. Alternatively, the user can exercise some control over the combination of the two images as explained in FIGS. 20 and 21.

Alternatively, the background of the final image may be provided from the slower exposure camera and the sharp image of the subject 134 only may be taken from the faster exposure image. In this manner, the wide-angle camera 120 could provide both the background and the blurred image of the subject 134. The processor 118 may automatically find the edges of the clear image of the subject 134 in the faster exposure image and take only the clear image of the subject 134 from the faster exposure image. The clear image of the subject 134 can then be added over the slower exposure image, either fully automatically, or with some user input, as described with respect to FIGS. 20 and 21.

Alternatively, the wide-angle camera 120 can be set to the faster shutter speed (and correspondingly higher ISO and/or lower f-stop) and the shutter speed of the telephoto lens camera 122 can be set to a slower shutter speed (and correspondingly lower ISO and/or higher f-stop), although the motion of the subject 134 would have to be in the smaller field of view of the telephoto camera 122. Again, the ISOs and/or apertures in each camera 120, 122 may be automatically adjusted to provide a proper exposure. Alternatively, the ISO and apertures settings in the longer exposure camera (in this example, the telephoto lens camera 122) may be ⅓ to 1⅔ stops below ideal exposure to provide a darker blur. Once again, either the blur may be copied into the faster exposure image, or the sharp image of the subject 134 can be copied into the slower exposure image.

As yet another alternative, the camera providing the fast shutter speed exposure may capture a first image immediately when the user presses the shutter release in addition to the fast shutter speed exposure at the end of the slower shutter speed exposure. This initial "background image" can have an even faster shutter speed than the one for obtaining the sharp image of the subject (by also raising ISO and/or lowering the f-stop). The background image can be used to capture an image that is all or mostly background, without the subject 134 or at least while the subject 134 is not overlapping the later sharp image of the subject 134. This background image can be used by the processor 118 to identify and locate the edges of the subject 134 in the fast shutter speed exposure in its final position. This is particularly useful in the optional implementation where the background is provided from the slower exposure camera and only the image of the subject is taken from the faster exposure image.

Figure 20:
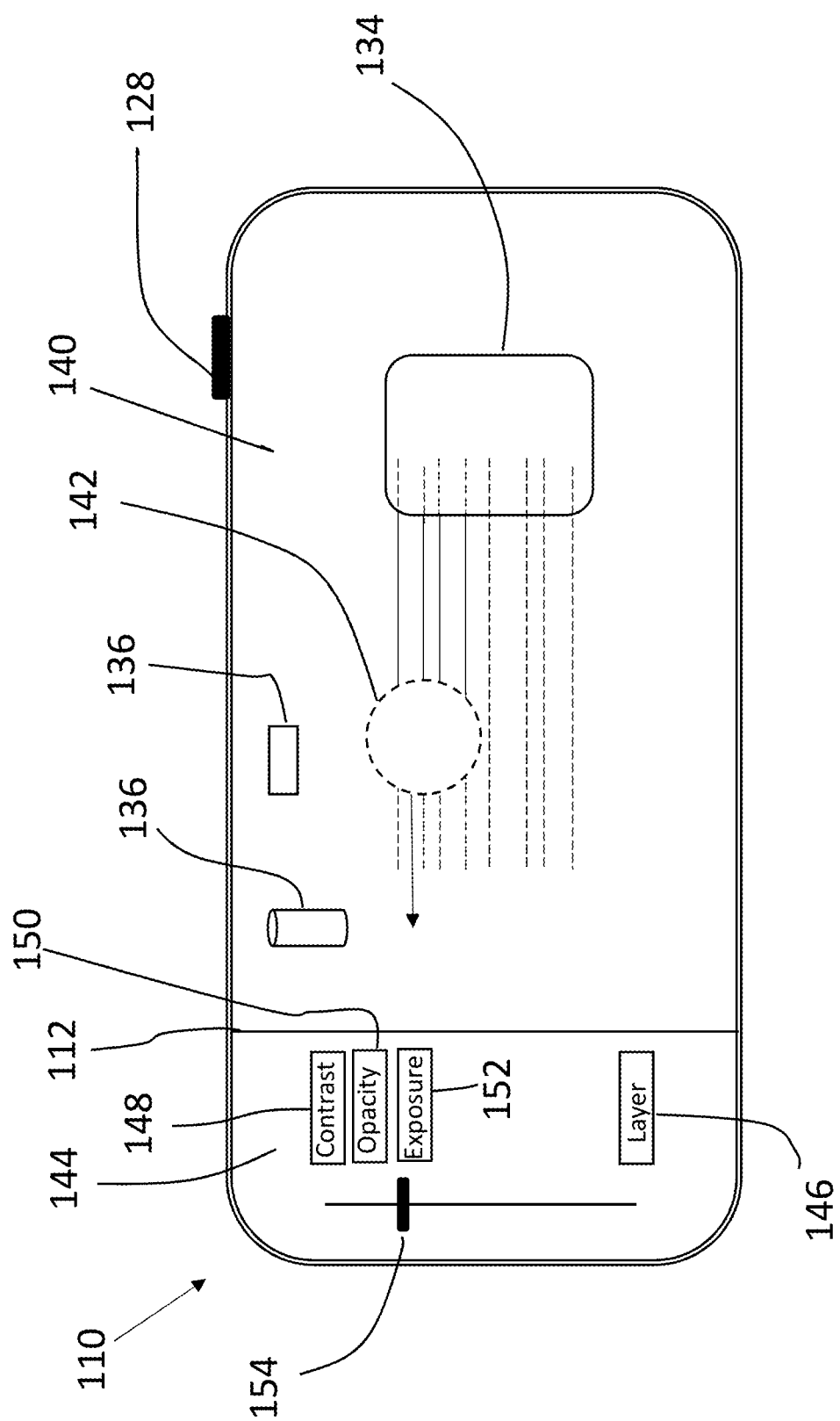
FIG. 20 shows a second user interface screen of the camera system of FIG. 18 for editing an image.

Referring to FIG. 20 a second user interface screen 140 may be provided for permitting the user to manually adjust how the two images will be combined. On the screen 140, the sharp image of the subject 134 and background objects 136 are displayed. The long exposure image is a layer "above" the layer containing the short exposure image but is initially set to an opacity of zero. The user can choose which parts of the long exposure image to make visible by swiping a finger 142 across the screen 140. For example, the opacity of the upper layer may be increased each time the user swipes a finger to the left across the screen 140. The opacity may be increased by a certain amount, for example 20%, for each swipe and only in the locations of the swipes. The edges of the swipes would be blended (e.g. increase the opacity by 20% in the middle 80% of the diameter of the swipe and gradually reduce the increase in opacity down to 5% toward the edges of the swipe). A swipe to the right would decrease the opacity of the upper layer by the same amounts (or by lesser amounts for more precision, e.g. 5%). In this manner, the user can quickly choose where the blur should begin, i.e. how much should the blur overlap of the sharp image of the subject 134 and how far after the subject 134 should the blur extend (up to the full amount of the blur from the long exposure image).

In a tool section 144 of the screen 140, the user may choose which layer (or both) to edit independently by toggling a layer button 146. The user can then touch a contrast button 148, opacity button 150 or exposure button 152 and then use the slider bar 154 to adjust the corresponding aspect of the selected layer (or both). When the user is done with the adjustments and selections, the user can save the final combined image to the photo database in the storage 116 on the smartphone 112.

Referring again to FIG. 19, to use the Burst Blur function, the user first chooses Burst Blur. At the desired time, when the subject 134 is in motion, the user presses either the GUI button 126 or the hardware button 128. The shutter of the wide-angle camera 120 is open for a relative long exposure (compared to the speed of the subject 134), which again may be adjustable by the user via a slider. The telephoto lens camera 122 takes a "burst" of sharp images throughout the long exposure.

Figure 21:
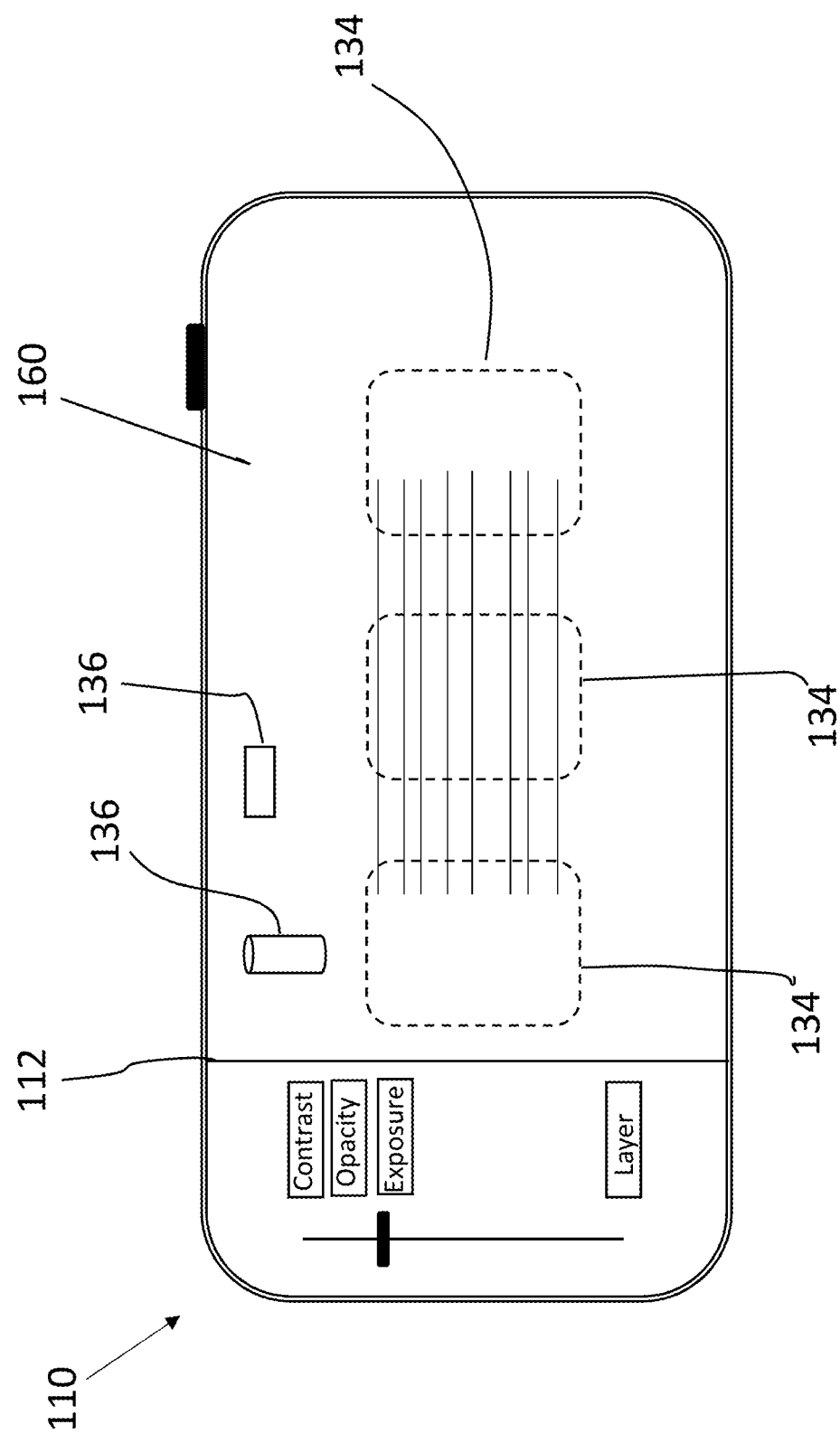
FIG. 21 shows a third user interface screen of the camera system of FIG. 18 for editing an image.

FIG. 21 shows a third user interface screen 160 of the camera system 110 of FIG. 18 after using the "Burst Blur" mode. Again, the long exposure image is presented as an upper layer with zero or low opacity. The multiple sharp images of the subject 134 captured by the telephoto lens camera 122 are all displayed on the screen 160. The user toggles between keeping and discarding each of the sharp images of the subject 134 each time the user touches each sharp image. After choosing the sharp image(s), the user can then choose which parts of the motion blur (and how opaque, etc) to keep, as described above with respect to FIG. 20.

For example, the user may choose a sharp image of the subject 134 from the end of the long exposure to obtain a trailing blur or a sharp image of the subject 134 from the beginning of the long exposure for a front-curtain sync effect. Alternatively, the user could choose a sharp image from the middle, but choose to only expose the portion of the blur image trailing that image. Alternatively the user could choose more than one sharp image to display in the final image and choose to have trailing motion blur behind each sharp image. When the user is done with the adjustments and selections, the user can save the final combined image to the photo database in the storage 116 on the smartphone 112.

The burst images could also be used as described above. Specifically, the background from some of the earlier images in the burst can be used to help find the subject and the edges of the subject in the later images in the burst.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. A camera system comprising:
an image sensor;
at least one lens in front of the image sensor; and
a variable light-transmissive filter in front of the image sensor, the variable light-transmissive filter configured to increase its light-transmissive properties from a non-opaque, light-transmissive initial setting by at least one stop at an end of an exposure of the image sensor.

2. The camera system of claim 1 wherein the variable light-transmissive filter is in front of the at least one lens.

3. The camera system of claim 2 wherein the variable light-transmissive filter is removably secured to the at least one lens.

4. The camera system of claim 3 wherein the variable light-transmissive filter is electronically connected to an external flash connector.

5. A camera accessory comprising:
a shutter configured to be secured to a front of a lens of a camera, the shutter including a variable light-transmissive filter capable of increasing its light-transmissive properties from a non-opaque, light-transmissive initial setting by more than one stop;
a battery pack configured to be connected to a hot shoe of the camera; and
a cable connecting the battery pack to the shutter.

6. The camera accessory of claim 5 wherein the camera accessory is configured to report itself to the camera as an external flash.

7. The camera accessory of claim 6 wherein the shutter is configured to increase its light-transmissive properties based upon receiving a signal to flash from the camera.

8. The camera accessory of claim 7 wherein the non-opaque, light-transmissive initial setting reduces light transmission by multiple stops.

9. The camera accessory of claim 8 wherein the non-opaque, light-transmissive initial setting reduces light transmission by at least three stops.

10. The camera accessory of claim 9 wherein the shutter is configured to increase its light-transmissive properties by multiple stops based upon receiving the signal to flash from the camera.

11. The camera accessory of claim 5 wherein the shutter is configured to increase its light-transmissive properties based upon receiving a signal to flash from the camera.

12. The camera accessory of claim 5 wherein the non-opaque, light-transmissive initial setting reduces light transmission by multiple stops.

13. The camera accessory of claim 5 wherein the non-opaque, light-transmissive initial setting reduces light transmission by at least three stops.

14. The camera accessory of claim 5 wherein the shutter is configured to increase its light-transmissive properties by multiple stops based upon receiving a flash signal from the camera.

15. The camera system of claim 1 wherein the filter is configured to increase its light-transmissive properties based upon receiving a signal to flash.

16. The camera system of claim 15 wherein the non-opaque, light-transmissive initial setting reduces light transmission by at least three stops and wherein the filter is configured to increase its light-transmissive properties by multiple stops based upon receiving the signal to flash.

* * * * *